United States Patent
Hayward

(10) Patent No.: US 8,435,329 B2
(45) Date of Patent: May 7, 2013

(54) FUEL CLEANING FOR GAS FIRED ENGINES

(75) Inventor: John Hayward, West Sussex (GB)

(73) Assignee: PPTEK Limited, Incorporated, Yapton, West Sussex (GB)

( * ) Notice: Subject to any disclaimer, the term of this patent is extended or adjusted under 35 U.S.C. 154(b) by 207 days.

(21) Appl. No.: 12/863,751

(22) PCT Filed: Jan. 21, 2008

(86) PCT No.: PCT/GB2008/000193
§ 371 (c)(1),
(2), (4) Date: Aug. 19, 2010

(87) PCT Pub. No.: WO2009/092983
PCT Pub. Date: Jul. 30, 2009

(65) Prior Publication Data
US 2010/0307335 A1    Dec. 9, 2010

(51) Int. Cl.
*B01D 53/04* (2006.01)
*B01J 20/26* (2006.01)

(52) U.S. Cl.
USPC .............................. 95/106; 95/141

(58) Field of Classification Search .............. 95/95, 106, 95/141, 148, 900; 423/210, 245.1; 502/402
See application file for complete search history.

(56) References Cited

U.S. PATENT DOCUMENTS

| | | | |
|---|---|---|---|
| 5,059,405 A | 10/1991 | Watson et al. | |
| 5,451,249 A | 9/1995 | Spiegel et al. | |
| 5,899,187 A | 5/1999 | Gruber et al. | |
| 6,605,135 B2* | 8/2003 | Lee et al. | 95/90 |
| 6,976,478 B2* | 12/2005 | Kato et al. | 123/519 |
| 2004/0237488 A1 | 12/2004 | Stenersen | |
| 2005/0092176 A1* | 5/2005 | Ding et al. | 95/90 |
| 2006/0000352 A1 | 1/2006 | Tower et al. | |
| 2006/0162566 A1* | 7/2006 | Kondo | 96/146 |

FOREIGN PATENT DOCUMENTS

| | | |
|---|---|---|
| DE | 3536158 A1 | 2/1986 |
| DE | 4220950 A1 | 1/1994 |
| DE | 19918946 A1 | 12/1999 |
| EP | 0818617 A1 | 1/1998 |
| JP | 1008061 A | 1/1989 |
| JP | 8025434 A | 1/1996 |
| JP | 2002282642 A | 10/2002 |
| JP | 2005-118661 A  * | 5/2005 |
| WO | 9534372 | 12/1995 |

OTHER PUBLICATIONS

Machine generated English translation of JP 2005-118661 A, published May 2005.*

* cited by examiner

*Primary Examiner* — Frank Lawrence, Jr.
(74) *Attorney, Agent, or Firm* — Dicke, Billig & Czaja, PLLC

(57) ABSTRACT

Gas fired internal combustion engines which are run on contaminated fuel suffer from the buildup of internal deposits and corrosion. This is a particular problem with engines fuelled by biogas, e.g. from waste decomposition. By filtering the fuel via a filter containing an ion-exchange resin substantial improvements can be obtained.

11 Claims, 1 Drawing Sheet

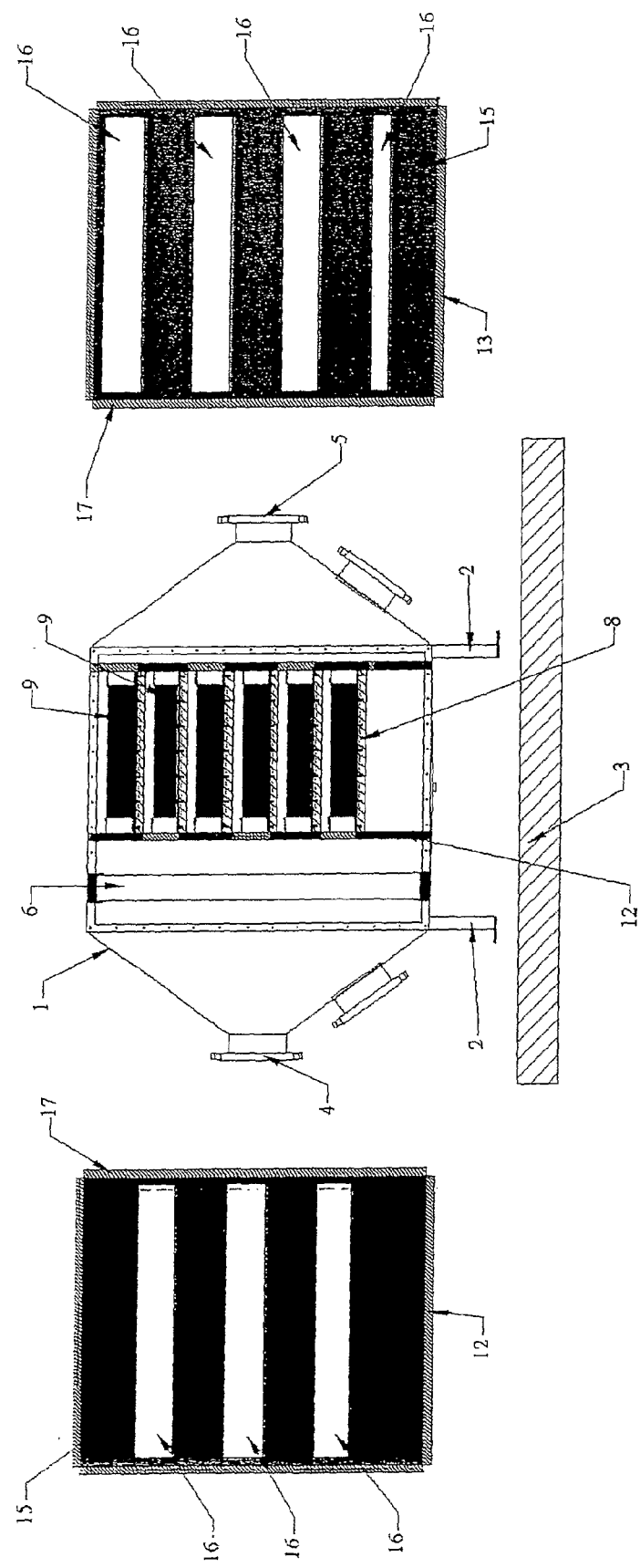

FUEL CLEANING FOR GAS FIRED ENGINES

RELATED APPLICATION

This application is a 371 National Stage entry of PCT/GB2008/000193, filed on Jan. 21, 2008.

This invention relates to fuel cleaning for gas fired engines, for example reciprocating internal combustion engines and gas turbine engines.

Both types of engine suffer from deterioration in performance and corrosion of their internal parts if the gaseous fuel supplied to them contains impurities. This occurs, in particular, where the fuel is, or contains as a principal component, methane. Such fuels are produced, for example, by the decomposition of waste matter on landfill sites, the decomposition of sewage in water treatment plants, or the decomposition of manure or from one of several biogas technologies being developed. The use of such fuels generally gives rise to a build up of deposits or matrices of carbon, silica and other contaminants within the engine, which compromises the efficiency of the engine and the output of the engine can deteriorate rapidly to a point at which, in order to maintain acceptable output, the engine has to be dismantled and the contaminated parts either cleaned or replaced, which is time consuming and expensive, particularly if replacement is needed because of the amount of corrosion or erosion of engine components by chemical contaminants derived from the fuel source.

For instance, with an engine used to drive a generator for generating electricity the generating power can be reduced by up to 10% typically from 1 Mw to 900 Kw over a period of a few months. Cleaning the incoming gas can eliminate these losses and allow the engine to run at full power for an extended period of time.

Whilst the build up of contaminants is often quite slow, on certain sites where the levels of siloxanes are high, and where, as a result, biogas derived from such sites contains, among other contaminants, a variety of volatile methyl siloxanes, severe levels of deposits can building up rapidly. Gas generated from landfill or sewage sites also typically contains volatile organic compounds, particularly chlorides and fluorides which, together with silicates and carbons, tend to form matrices with atmospheric contaminants and corrode engine parts over short periods of time. In addition the presence of various sulphur and chlorine-containing compounds, for example hydrogen sulphide, leads to the formation of unwanted acid derivatives that can lead to severe corrosion within the engine, especially where engine parts are in contact with lubricating oil.

It has been appreciated for some time that if the contaminants could be eliminated from the gas fuel feed, the formation of such matrices and acidic deposits can be avoided and thus corrosion of engine parts from these sources eliminated. Up until now, this has been achieved passing the gas through either an activated carbon filter, e.g. as described in U.S. Pat. Nos. 5,451,249 and 5,899,187 or through a compounded liquid, usually water-based, e.g. as described in U.S. Pat. No. 5,059,405 and WO 95/34372. Known carbon filters are reasonably efficient but their expense is such that payback times for the initial installation set-up cost and thereafter regular replacement of the carbon are long, making the use of such systems only viable where severe problems exist. The use of compounded liquid systems is quite common, but the amount of contamination removed by such systems is very limited and they are considered to be largely inefficient.

DE-A-19918946 discloses an arrangement of an adsorber and a dehumidification device upstream of the engine, and refers to EP-A-0818617, which uses activated charcoal as the adsorber. Alumina and zeolite are also disclosed as possible absorbers. DE-A-3536158 discloses the use of certain clay minerals, notably bentonite and montmorillonite, to clean waste gases, while DE-A-4220950 discloses the use of bentonite or wollastonite to clean fossil fuel gases.

DESCRIPTION OF THE DRAWING

FIG. 1 is a diagrammatic view of an embodiment of a filter chamber.

DETAILED DISCLOSURE

We have now found that effective filtration of impurity-containing feed gases used to fuel combustion engines can be achieved simply and in a far more cost-effective fashion by the use of a filter between the gas supply and the engine itself where the filter contains an ion-exchange resin, particularly one shown to have a high affinity for siloxane compounds.

In one preferred embodiment, a method of cleaning a fuel gas for an internal combustion engine comprises passing the fuel gas through a filter, wherein the filter comprises a styrene-divinyl benzene-based ion-exchange resin, and wherein the filter contains more than one type of ion-exchange resin. In another particularly preferred embodiment, there are at least two types of ion-exchange resin which differ in their pore sizes, in which case it is even more preferred that the average pore size of one type of resin is in the range of 100 to 150 Angstroms and that of another type of resin is in the range of 20 to 50 Angstroms.

Ion-exchange resins are standard well-known commodities available in a wide variety of types. They generally consist of a synthetic resin containing active groups (usually sulphonic, carboxylic, phenol or substituted amino groups) providing the resin with the property of combining with or exchanging ions between the resin and a solution. They are widely used to soften water and to remove unwanted contaminants, e.g. to remove iron from wine. They can also be used to recover valuable materials from liquid waste streams. They are also used for recovery of the material from gas streams, e.g. nicotine from tobacco dryer exhaust, polonium from tobacco smoke (incorporated in a filter tip), and for the removal of impurities from air for use in "clean" environments such as in the semiconductor manufacturing industry or in the biotech industry, see, for example, JP-A-1008061 and JP-A-8025434, and for cleaning exhaust gases (see, e.g., JP-A-2002282642).

Clearly for gas filtration, the gas needs to be passed through some sort of filter structure during which it comes into contact with the resin. The type of structure may vary widely, but simple arrangements are preferred since they tend to be inexpensive and easy to maintain. For example, a filter structure for use in the present invention may consist simply of a container containing granules of the resin through which the incoming contaminated gas fuel stream is passed, positioned between the engine and the incoming gas supply. As the gas passes through the resin, the contaminants within the gas are largely or wholly removed, leaving a purer gas for powering the engine. Such a filter structure also removes liquid contaminants from the contaminated gas feed and so leaves a more combustible material to fuel the engine Most conveniently, the filter is presented in the form of a replaceable cartridge.

The resin in such a filter structure is preferably in the form of granules rather than powder as the use of powder tends to give a filter through which the fuel gas can only pass with an unacceptable pressure drop, at least for a reasonable size filter. The fuel gas flow can be substantial for waste gas combustion applications, e.g. 700 m³ per hour for just one engine, proportionately more if gas fed to several engines is passed through a common filter for cleaning.

After a period, the length of which depends on the levels of contaminants, usually one day to a month, the filter, e.g. a cartridge containing the resin will become saturated and require changing for a new one. This may be done, for example, simply by unbolting an old cartridge from the gas fuel line and inserting a new cartridge. The cartridge is usually fitted into a bypass line or two filters are arranged in parallel so that the gas can be redirected during cartridge replacement without the engine being turned off.

Preferably the cartridge or like container construction is one which enables the resin to be removed and disposed of so that the container can then be refilled with fresh uncontaminated resin. Alternatively and preferably, the cartridge may be regenerated if the nature of the resin and contaminants is appropriate. For example, if the contaminants are siloxanes, the resin can be revived once saturated simply by heating to vaporise the siloxanes, usually to around 120° C. or slightly higher. This can be achieved even if the temperature is lower than the actual boiling point of the siloxane in question, as is often the case. Thus, five major siloxanes which are often found as contaminants in landfill gas, viz. hexamethyldisiloxane, hexamethylcyclotrisiloxane, decamethylcyclopentasiloxane, octamethylcyclotetrasiloxane and dodecamethylpentasiloxane have boiling points of 134, 210, 176 and 245° C. respectively, but all can be removed from a resin at around 120° C. as, at this temperature, they are relatively weakly adsorbed. The heating to effect such regeneration can, if desired, take place with the filter in situ, using heat from the gas-fired engine itself, or its exhaust or heater air, or by incorporating a microwave or RF heating system into the resin-containing container structure or pumping hot air through pipes embedded within the media.

The way in which the filter may be engineered and operate will also vary with the size and type of combustion engine installation upstream of which it is to be installed. For example, if the unit is designed to filter the incoming methane gas for an engine or a multiplicity of engines of between 900 KW and 6 MW, it may be constricted as an automated system incorporating two filter chambers, each of which is automatically changed to be the duty filter after each predetermined filtration period, usually each three to forty eight hours. In the larger models, between one and sixteen filter cassettes can be used depending upon the gas flow rate and the amount of contaminants detected in the gas. In these larger systems, a regeneration programme may be run automatically at a predetermined time and the resulting desorption air incinerated by either electrical or direct flame thermal destruction, either by means forming part of the filter unit, or located nearby.

In smaller systems designed for use upstream of engines between 50 KW and 500 KW, a single filter chamber, usually with one to three filter cassettes, is generally adequate, with the gas, during regeneration, being re-routed to the engine through a bypass system. The regeneration process may be carried out in such cases either by taking a mobile regeneration unit to the site and manually attaching to the filter, or by returning the filter cassette to a purpose-built regeneration unit situated in a suitable building. In the case of a mobile on-site regeneration system, once a bypass line has been activated, regeneration then takes place by passing hot air over the filter media, the resultant desorbed air being then incinerated e.g. on a mobile regeneration system skid or nearby.

If the cassette is removed for off-site regeneration, it may be returned to a plant where a fixed regeneration system is available and in which the cassette is placed in the regeneration system and hot air is passed over the filter media until the media is desorbed. The resultant air is then incinerated in a thermal oxidation chamber, or by burning in a small flare. In certain circumstances, the media may be desorbed by washing using a solvent, e.g. an alkane, such as hexane or an alcohol, such as ethanol to remove the adsorbed contaminants. In a typical off-site filter regeneration plant, this may be done by installing a spray system above a support for the filter cassettes and spraying the desorbant over the granules for between ten and thirty minutes. The solution is collected and other contaminants may then be separated from the siloxanes and the desorbant by distillation.

In the installations where a filter containing the granules of resin is installed in a single chamber, the filter should be constructed to allow regeneration of the media whilst the gas is directed to the engine via a bypass pipe. The filter media is regenerated by passing a stream of hot air e.g. at 80 to 260° C. over the media for between 30 and 240 minutes. This releases the contamination molecules from their adsorbed state and the resultant desorbed air containing the contaminants may then be incinerated in a small flare or thermal oxidation chamber forming part of the filter installation or installed in a mobile regeneration system.

In larger installations, it is preferred to provide two filter chambers, with the regeneration process being carried out automatically after each period of filtration, typically every twenty four hours. An automated controller may be programmed to activate the regeneration process at a predetermined time or when the filter bed has become partially saturated. At the desired time, the controller will switch filtration from the previously active filter chamber to the second filter chamber which will have previously been regenerated. The controller will then activate a heater and blower to pass hot air over the filter media in the filter chamber to be desorbed, preferably at a flow rate of 100 to 500 m³/hour, to raise the temperature of the media to a predetermined level, e.g. 80 to 260° C. The hot air may be passed through the media to regenerate it for between 30 minutes and five hours, the length of time depending on the type of contamination adsorbed by the filter media and the level of desorption required. The resultant air containing the desorbed contaminants, usually volatile organic compounds, including volatile methyl siloxanes, may then be incinerated in a small flare or thermal oxidation chamber, by heating the air to temperatures of 700 to 1200° C. for 0.1 to 2 seconds, so as to ensure the complete destruction of any substances, particularly of volatile organic compounds that might be potentially damaging to life or the environment.

An alternative highly effective regeneration process for the media which avoids the thermal cycling and consequent mechanical stresses arising with hot air regeneration techniques is to desorb the contaminants by subjecting the media to reduced pressure and microwave radiation. This can even remove high boiling volatile organic compounds that have a tendency to build up with other types of desorption. Using magnetrons with an output of 50 to 5000 Watts and 10-20 amps at a frequency of 2250 to 2650 MHz and reducing the pressure from atmospheric by at least 50 mb, and preferably by 250 mb or more, complete desorption may be achieved to return filter media to an as new state. The media used in the present invention are not heated up by the microwave irradiation, which acts exclusively to heat the contaminants, and, as a result, there is little or no thermal cycling or expansion/contraction of the media, so prolonging service life. A microwave and vacuum combination enables the theoretical temperature of desorption to be raised to over 200° C. where the actual temperature is below 100° C. thus preserving the integrity of the media over much longer periods of time and enabling the higher boiling volatile organic compounds to be desorbed successfully. This approach also reduces the power consumption of the system during desorption e.g. from 34 kWh for 2-3 hours to under 10 kWh for 15 minutes to 2 hours, thus reducing running costs substantially.

In both single and dual filter chamber arrangements, the desorption programme is preferably carried out with a reverse airflow through the filter chamber(s). By reversing the airflow for the desorption process, the contaminants adsorbed on the front of the filter bed are released without the potential to be re-adsorbed by other filter granules within the same or other beds, which could occur if the desorption flow was in the same direction as the gas flow.

A preferred filter chamber design consists of a casing adapted to receive a number of cassettes filled with media placed in a vertical or horizontal arrangement so as to provide sufficient adsorption capability to adsorb the incoming siloxane molecules for a minimum of one and up to twenty four hours, i.e. between regeneration periods. It is an optional programme that the filters can be controlled to change over and regenerate more frequently nominally after operation for between one and twelve hours; this programme might be decided due to the requirement to spread the regeneration over a longer period for environmental reasons, rather than regenerate 24 hours of contaminants at one time, thus the level of release to atmosphere of the regenerated air after incineration might be between 4% and 50% of the release to atmosphere following regeneration each 24 hours. The cassettes are preferably so arranged that a minimum pressure drop is experienced by the gas as it flows through the filter, preferably between 5 and 25 millibars irrespective of the number of horizontal cassettes arranged within the filter chamber(s). Gas flow within the filter chamber is preferably controlled by one or more internal baffle plates freeing the gas to enter the filter bed only through a particular entry point or points, then to pass through the filter cassettes and only to emerge from a corresponding exit point or points after it has traveled through all of the filter cassettes.

The use of individual filter cassettes placed in a filter chamber enables each of them to process a similar amount of gas, thus providing a large filter surface area in a relatively small amount of space. In addition, directing the gas to pass only through the cassette enables the pressure drop across the filter to be kept to a minimum whilst giving the largest possible amount of filter bed area to adsorb the contaminants and allowing sufficient heating during the desorption process.

Preferably, upstream of any filter media, a moisture coalescer is installed, e.g. a fine stainless wire mesh. This removes some of the moisture from the gas prior to it reaching the filter cassette. Moisture removed by the coalescer may be drained from a filter chamber via condensate drainage points located in the floor of the chamber.

The accompanying drawing shows diagrammatically a suitable filter chamber. Referring to the drawing, a chamber 1 is set on four feet 2 on a plant base 3 such as a concrete slab. The chamber 1 consists of a rectangular section steel casing having at each end a pyramidal funnel terminating in a port with a connector flange 4, 5. Extending across the entire interior space of the casing at the upstream end is a condenser unit 6, for example a fine stainless steel wire mesh, through which the fuel gas passes from the flanged inlet port 4 to the filter cassettes themselves.

The filter cassettes are located on a set of support trays 8 e.g. of L section stainless material and each cassette consists of a slab-like package of ion exchange resin e.g. contained in a permeable outer casing, for example of a stainless textile material. Each such textile material casing is denoted 9 in FIG. 1.

The casings 9 are sized to be a close fit in the support structure which has an upstream baffle plate 12 and a downstream baffle plate 13. Plates 12 and 13 are shown to either side of the central portion of FIG. 1 and it can be seen that they consist of a steel plate 15 having three or four slots 16 in it through which the gaseous fuel may pass. Around the edges is provided a right-angled sealed section 17. As can be seen from FIG. 1, the inflowing gas is constrained to pass through the slots 16 in baffle plate 12, then through one of the packages of ion exchange resin 9 and then out through one of the slots 16 in plate 13.

Constructing the filter chamber in this way enables a large volumetric flow to be maintained with very little pressure drop across. Once the gases have passed through the filter packages 9, and the slot 16 in baffle plate 13, they flow together to the outlet orifice with flange 5 which is connected via a suitable flow pipe to the fuel inlet for the internal combustion engine.

A wide variety of ion exchange resins is available in commerce and many of these have the capacity to absorb siloxanes from a gas stream, including all five siloxanes noted above, and other silicon-containing compounds, such as trimethylsilanols and tetramethylsilanes, as well as a variety of volatile organic compounds including a range of chlorinated compounds, viz vinyl chloride, dichlormethane and chlorobenzene. The performance of individual ion exchange resins, however, varies not only as between the resins, but, over time, in connection with an individual resin type. The reasons for this are not fully understood, but even partially substantial effective siloxane removal may have a material effect on engine life.

In order, however, to optimise performance, it is desirable to select an ion exchange resin which works effectively on the spectrum of contaminants present in the unfiltered gas, and this may vary with the specific source of that gas. It is particularly preferred to use a mixture of ion exchange resins of different absorption properties. The resins may be used physically in admixture one with another in a composite filter unit, or, alternatively, the gas stream may be passed sequentially through two (or more) separate filter units, each containing a different ion exchange resin. If more than one filter is used, the upstream filter is preferably filled with material designed to remove the majority of the contaminants while the downstream filter may be targeted to remove those which the upstream filter removes inefficiently or, in some cases, not at all.

As a general rule of thumb, we have found that good results may be obtained by the use of two different filters or a combined filter with an admixture of resins in it where the average pore diameter in the resins is, for example, within the range of 100 to 150 Angstroms in the case of one resin and 20 to 50 Angstroms in the case of the other.

The following examples will serve to illustrate the invention:

EXAMPLE 1

A landfill site was identified, on which was located a 1.3 MW Jenbacher 320 reciprocating engine, the engine running on methane produced by the decomposing industrial and household waste at the site, and driving a generator. Analysis of the infeed gas showed it to contain:
Hexamethylcyclotrisiloxane 2.7 mg/m$^3$
Octamethylcyclotetrasiloxane 9.0 mg/m$^3$
Decamethylcyclopentasiloxane 6.0 mg/m$^3$.

Inspection of combustion surfaces internally of the engine showed substantial deposits of siliceous material, mostly silicon dioxide.

Measurement of the power output revealed that despite a rated power output of 1.3 MW, the actual operating output was only 960 KW.

A filter was then inserted into the feed line to the engine, following a stripdown and cleaning of its combustion surfaces. The filter consisted of a cylindrical housing of diameter 800 mm and length 400 mm, which was filled with around 45 Kg of Dowex Optipore V503 (Ex Dow Chemical Company). Analysis of the siloxane level in the output stream of fuel gas which constituted the infeed to the engine and which had a volumetric flow rate of around 700 m$^3$/hour showed it to contain:
Hexamethylcyclotrisiloxane <1 mg/m$^3$
Octamethylcyclotetrasiloxane <1 mg/m$^3$
Decamethylcyclopentasiloxane 2.2 mg/m$^3$.

The resultant clean running of the engine enabled a measured power output of 1.3 MW to be achieved and maintained for several months essentially unchanged.

EXAMPLE 2

Example 1 was repeated with the filter filling being a mixture of 10 parts by weight of exchange resin noted in Example 1 with 1 part by weight of a different ion-exchange resin (Amberlite® XAD4 ex Rohm & Haas). The cleaned fuel gas contained:
Hexamethylcyclotrisiloxane <1 mg/m$^3$
Octamethylcyclotetrasiloxane <1 mg/m$^3$
Decamethylcyclopentasiloxane <1 mg/m$^3$.

The further improvement obtained by using a combination of polymeric resins is believed to stem from the fact that the resins have different pore sizes which improves the adsorption of a wide range of siloxanes, especially of the siloxanes with a larger molecular size. The pore size of the Dowex resin is believed to be around 34 Angstroms, while that of the Amberlite is in the range of 100 to 150 Angstroms.

EXAMPLE 3

A landfill site was identified on which was located a 1.3 MW Jenbacher 320 reciprocating engine, the engine running on methane produced by the decomposition of industrial and household waste at the site, and driving a generator. Analysis of the infeed gas showed it to contain the following concentrations of specific contaminants:
Hexamethyldisiloxane 2.0 mg/m$^3$
Hexamethylcyclotrisiloxane 1.5 mg/m$^3$
Octamethylcyclotetrasiloxane 14.9 mg/m$^3$
Decamethylcyclopentasiloxane 12.3 mg/m$^3$
Dichloromethane 55.2 mg/m$^3$
Trichloroethane 29.4 mg/m$^3$
Tetrachloroethylene 97.9 mg/m$^3$
1,1-dichlorethane 1.5 mg/m$^3$
cis-1,2-dichlorethylene 228.5 mg/m$^3$
Vinyl chloride 194.4 mg/m$^3$
Chlorobenzene 2.1 mg/m$^3$
Chloroethane 3.7 mg/m$^3$ In all, the contamination levels for contaminant types amounted to:

Total Chlorinated Compounds 612.7 mg/m$^3$
Total Fluorinated Compounds 64.7 mg/m$^3$
Total Organo-Sulphur Compounds 14.9 mg/m$^3$ Inspection of the combustion surfaces internally of the engine showed substantial corrosion and deposits of siliceous material, mostly silicon dioxide.

Measurement of the power output revealed that, despite a rated output of 1.3 MW, the actual operating output was only 940 KW.

A filter was then inserted into the feed line to the engine, following a strip down and cleaning/replacement of the combustion surfaces. The filter consisted of a cylindrical housing of diameter 800 mm and length 400 mm, which was filled with around 32 kg of Dowex Optipore V503 (Ex Dow Chemical Company) and 8 kg of Amberlite® XAD4 ex Rohm and Haas. Analysis of the contaminant level in the output stream of fuel gas which constituted the infeed to the engine and which had a volumetric flow of around 700 m$^3$/hour showed it to contain:
Hexamethyldisiloxane <1.0 mg/m$^3$
Hexamethylcyclotrisiloxane <1.0 mg/m$^3$
Octamethylcyclotetrasiloxane <1.0 mg/m$^3$
Decamethylcyclopentasiloxane <1.0 mg/m$^3$
Dichloromethane <1.0 mg/m$^3$
Trichloroethane <1.0 mg/m$^3$
Tetrachloroethylene <1.0 mg/m$^3$
1,1-dichlorethane <1.0 mg/m$^3$
cis-1,2-dichlorethylene <1.0 mg/m$^3$
Vinyl chloride 2.0 mg/m$^3$
Chlorobenzene <1.0 mg/m$^3$
Chloroethane <1.0 mg/m$^3$
with overall contaminant levels of
Total Chlorinated Compounds 2.0 mg/m$^3$
Total Fluorinated Compounds 12.0 mg/m$^3$
Total Organo-Sulphur Compounds <1.0 mg/m$^3$ The resultant clean running of the engine enabled a measured power output of 1.3 MW to be achieved and maintained for several months essentially unchanged.

In all three of these Examples, the performance of the filter may be further enhanced by incorporating, e.g. to form between 5 and 10% of the ion-exchange resin, a further ion-exchange resin particularly effective in trapping silanols and silanes. A suitable resin is commercially available under the designation Amberlite® XAD7HP which has a pore diameter distribution mostly in the range of 320 to 420 Angstrom. Absorbed silanols and silanes can be removed by warm air at 70 to 120° C. over the resin.

The invention claimed is:

1. A method of cleaning a fuel gas for an internal combustion engine which comprises passing the fuel gas through a filter, wherein the filter comprises a styrene-divinyl benzene-based ion-exchange resin, and wherein the filter contains more than one type of ion-exchange resin.

2. A method according to claim 1 wherein the filter comprises a hollow container having an interior, a feed port and an outlet port, and wherein the interior of the container contains granules of the ion-exchange resin.

3. A method according to claim 1 wherein at least two types of ion-exchange resin differ in their pore sizes.

4. A method according to claim 3 wherein the average pore size of one type of resin is in the range of 100 to 150 Angstroms and that of another type of resin is in the range of 20 to 50 Angstroms.

5. A method according to claim 1 wherein the fuel gas is biogas derived from decomposition of waste materials.

6. A method according to claim 5 wherein the biogas comprises siloxane impurities.

7. A method according to claim 1 further comprising regularly regenerating the filter to remove contaminants abstracted from the fuel gas.

8. A method according to claim 7 wherein regenerating the filter comprises subjecting the filter to microwave radiation to remove contaminants therefrom.

9. A method according to claim 8 wherein the filter is subjected to microwave radiation while the filter is maintained at a reduced pressure below atmospheric pressure.

10. A method according to claim 9 wherein the reduced pressure is at least 50 millibars below atmospheric pressure.

11. A method according to claim 10 wherein the reduced pressure is at least 250 millibars below atmospheric pressure.

* * * * *